T. MARTIN.
APPARATUS FOR CUTTING WELTING.
APPLICATION FILED JUNE 8, 1912.

1,228,365.

Patented May 29, 1917.
5 SHEETS—SHEET 3.

Witnesses:
Horace A. Croseman
Carl L. Choate.

Inventor:
Thomas Martin
by Emery Booth Janney Varney
Attys.

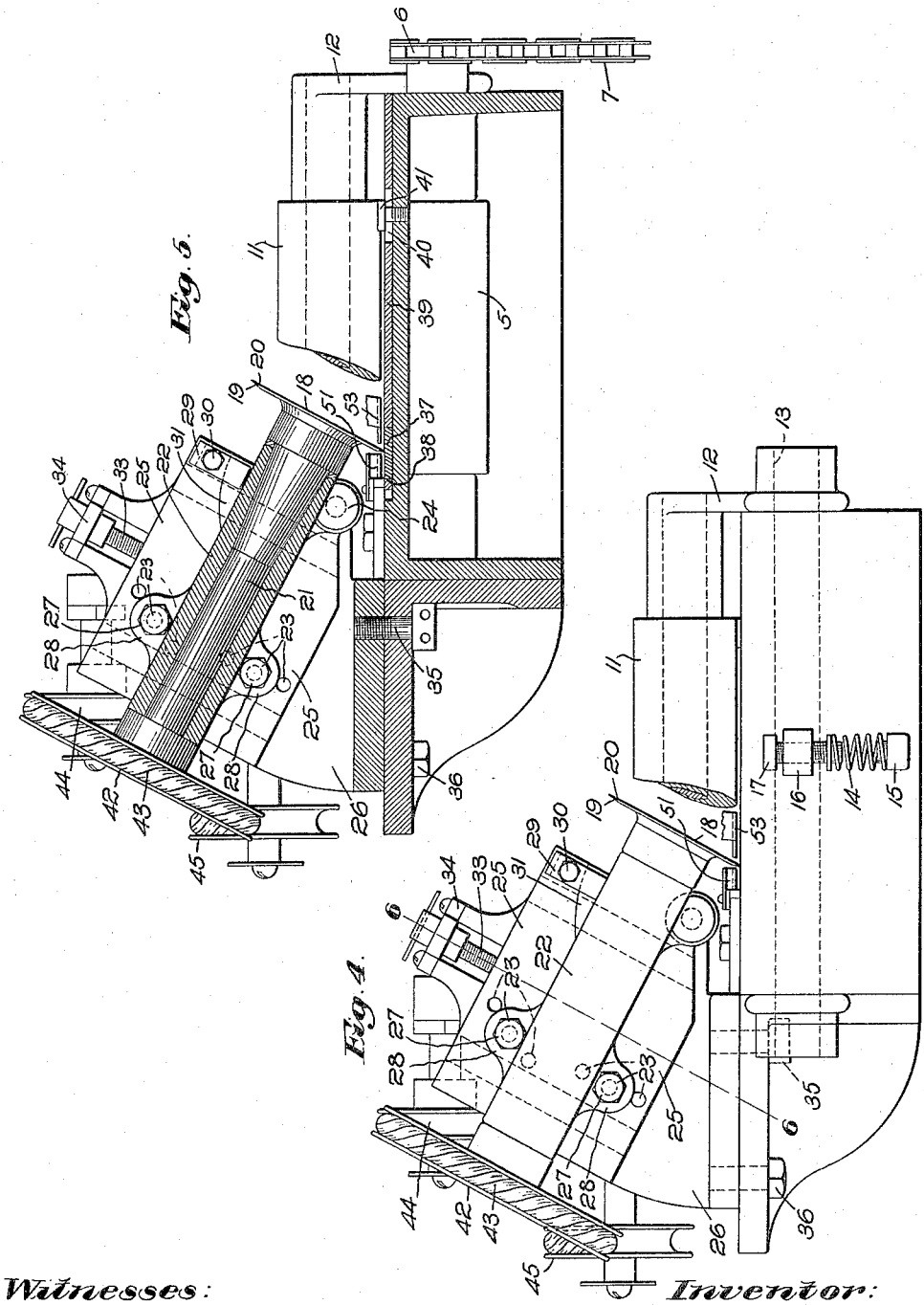

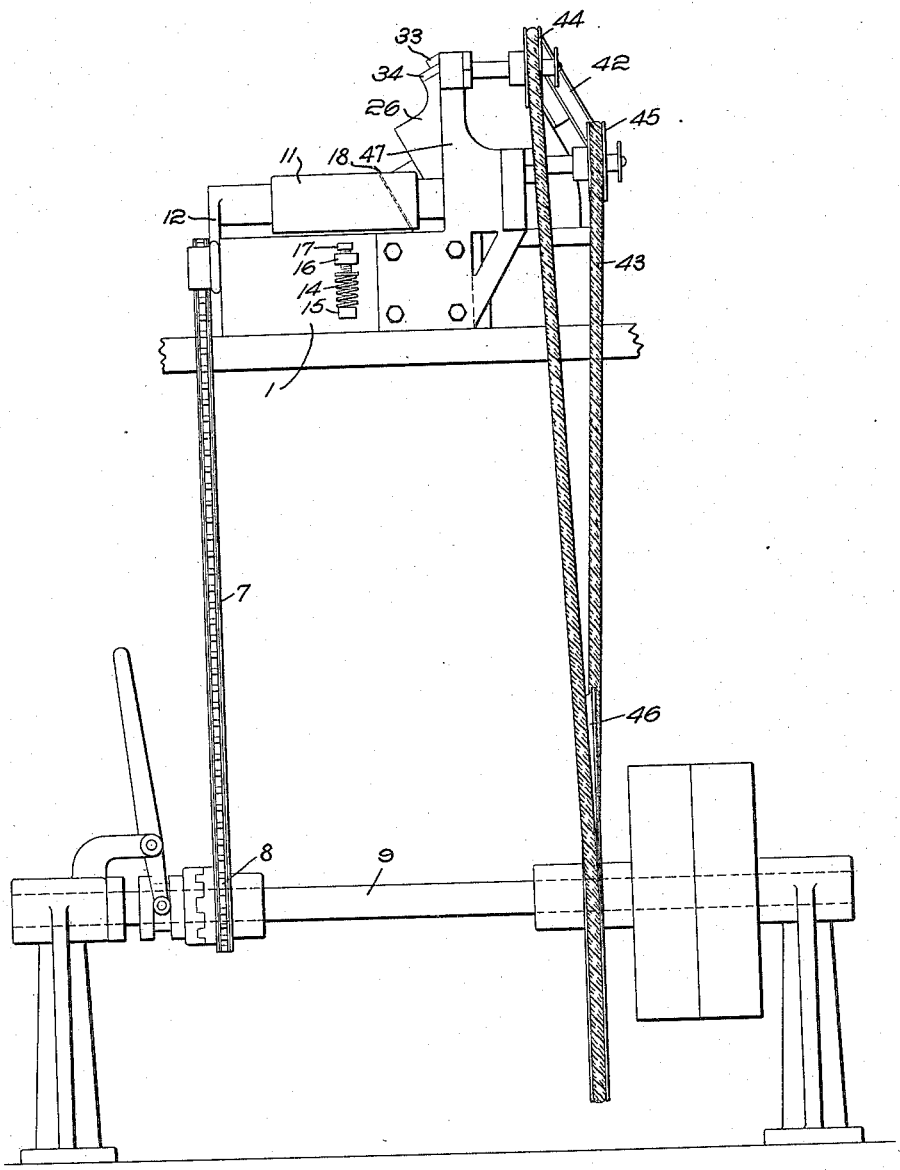

UNITED STATES PATENT OFFICE.

THOMAS MARTIN, OF DORCHESTER, MASSACHUSETTS, ASSIGNOR TO WILLIAM B. ARNOLD, OF NORTH ABINGTON, MASSACHUSETTS.

APPARATUS FOR CUTTING WELTING.

1,228,365.

Specification of Letters Patent.

Patented May 29, 1917.

Application filed June 8, 1912. Serial No. 702,488.

*To all whom it may concern:*

Be it known that I, THOMAS MARTIN, a citizen of the United States, and a resident of Dorchester, in the county of Suffolk and State of Massachusetts, have invented an Improvement in Apparatus for Cutting Welting, of which the following description, in connection with the accompanying drawings, is a specification, like characters of the drawings representing like parts.

This invention relates to apparatus for cutting stock and more particularly for cutting leather stock into welting having beveled edges.

In order that the principle thereof may be readily understood, I have disclosed a single embodiment thereof in the accompanying drawings, wherein—

Fig. 4 is an end elevation thereof;

Fig. 5 is a transverse sectional view upon the broken line 5—5 of Fig. 2;

Fig. 6 is a section on the broken line 6—6 of Fig. 4, and

Fig. 7 is an end elevation of the entire machine showing the main and countershafts.

Figure 1:
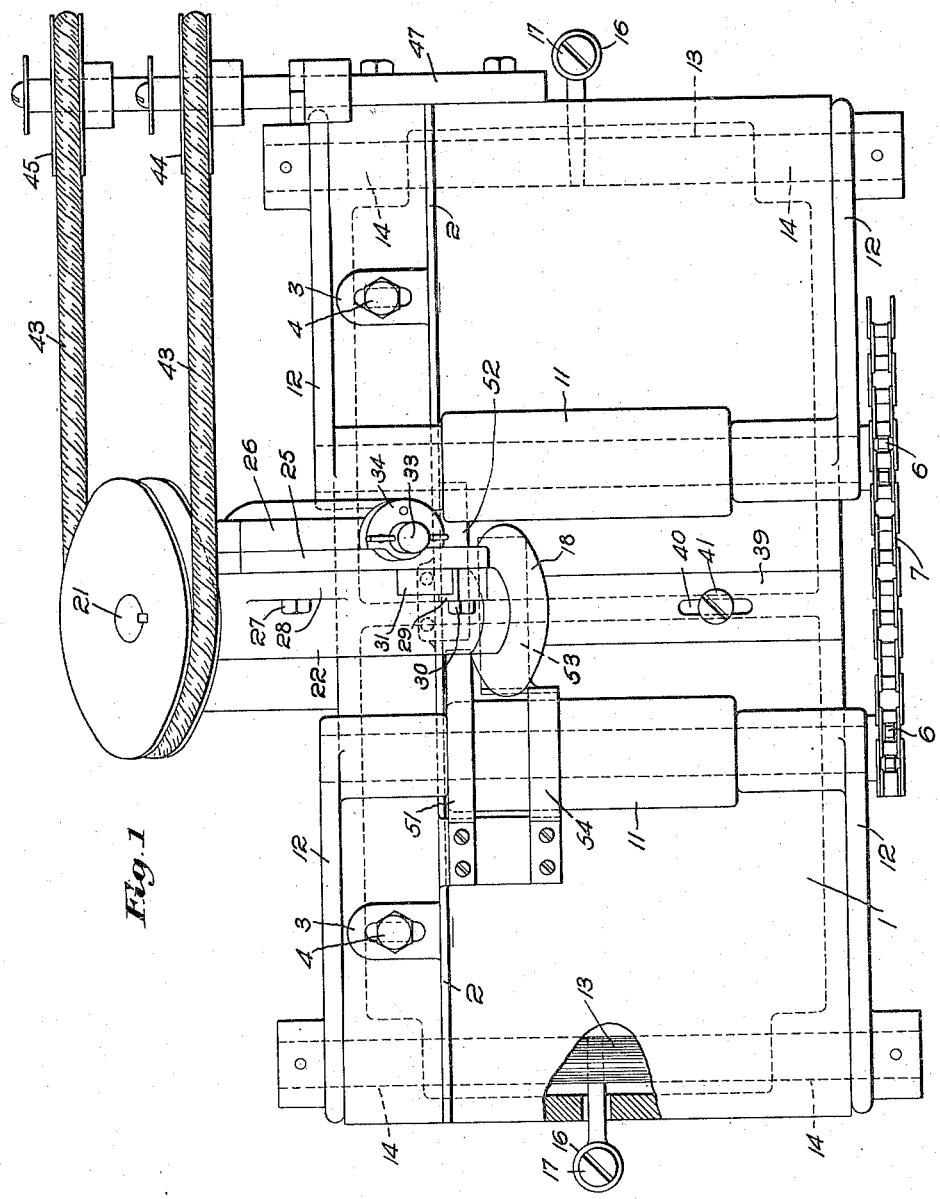
Figure 1 is a plan view of one form of apparatus embodying my invention.
Figure 2:
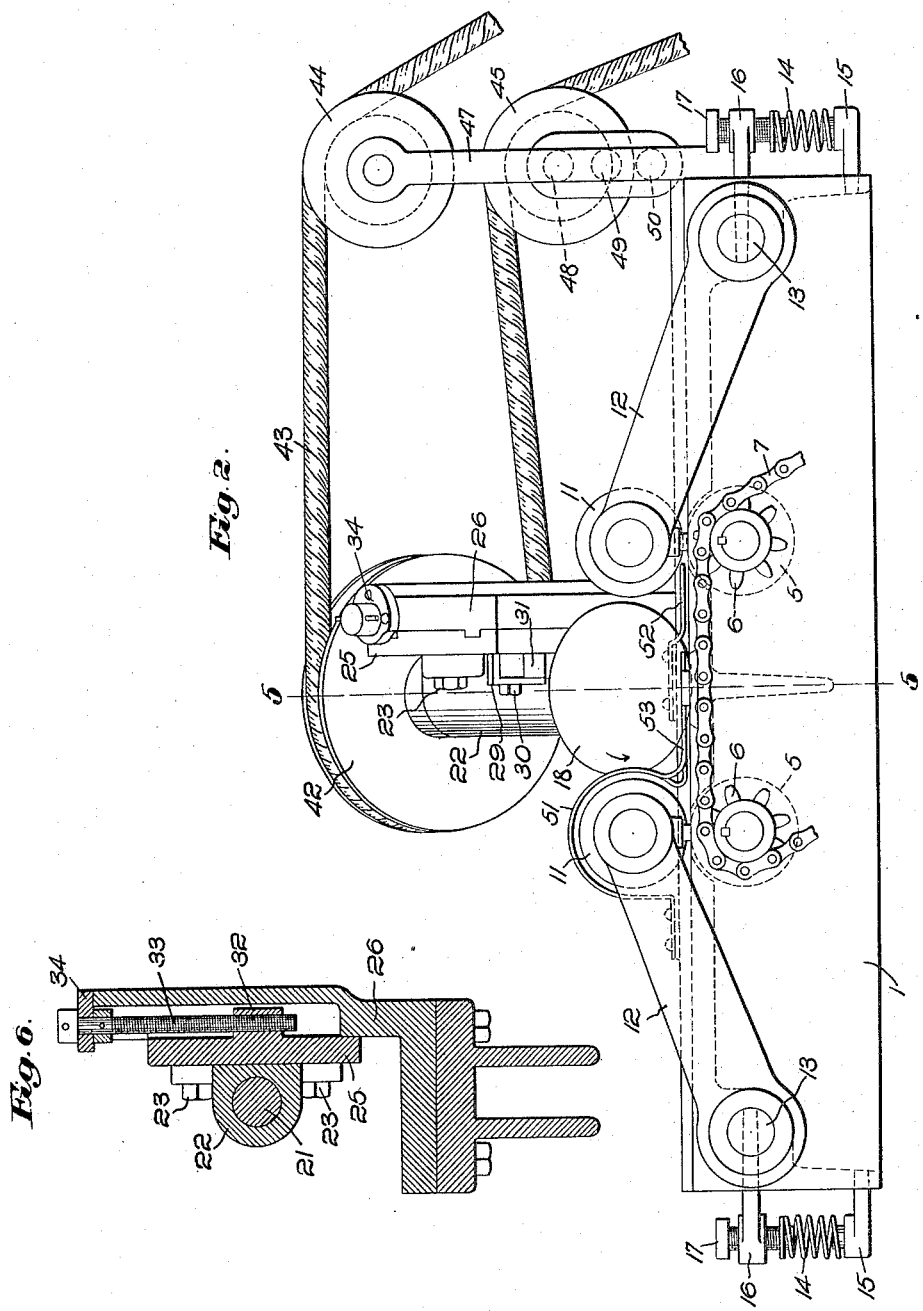
Fig. 2 is a side elevation thereof.

While my invention in certain embodiments thereof may be employed in other relations, it is particularly intended for use in cutting welting for boots and shoes, and particularly for so cutting the welting that the latter has at least one beveled or tapered edge. In the preferred embodiment of my invention, the apparatus is so constructed that the welting when cut from the stock is provided with opposite, parallel, beveled edges inclined in parallelism.

So far as I am aware, I am the first to construct an organized mechanism for cutting welting having opposite beveled edges. Machines have heretofore been invented to cut stock upon a bevel, but so far as I am aware such machines have never heretofore been employed for cutting leather stock along straight, parallel lines so as to produce welting having both edges beveled or tapered.

Referring more particularly to the drawings, the bed plate of the machine whereon the operating parts are mounted is represented at 1 in the several figures. Thereon I mount a gage 2 having slotted ears 3 whereby it is adjustably secured to the bed plate through the instrumentality of bolts 4, thus adapting the machine to cut welts of any desired width. The said gage 2 has a straight inner edge thus insuring the cutting of the welting along straight, parallel lines.

Suitably mounted in the framing of the machine beneath the top surface of the bed plate I mount feed rolls 5—5, preferably rough turned and unpolished and having thereon sprocket pinions 6—6 receiving a sprocket chain 7 passing about a sprocket gear 8 on a countershaft 9 driven from a main drive shaft in any suitable manner. Co-acting with the feed rolls 5—5 is a pair of feed rolls 11, 11 rotatably mounted in rocker arms 12—12 fast upon rocker shafts 13, 13 mounted in suitable bearings 14, 14 in the framing of the machine. In order to hold the feeding rollers 11, 11 in proper relation to the work and to the feeding rolls 5—5, I may employ any suitable devices. For the purpose I have herein represented coil springs 14—14 positioned between brackets 15, 15 preferably driven into tapered sockets in the framing of the machine, and pins 16 driven into and extending from the rocker shafts 13. Preferably I employ adjusting screws 17 by means of which the tension of the coil springs 14 may be varied. By the described construction, the feed rolls 11 are forced with suitable and variable pressure against the stock, and are driven only by their engagement therewith, the feed rolls 5—5 being positively driven.

While any suitable severing or cutting means may be employed, I preferably employ a circular blade mounted upon a spindle or other suitable support and driven at a proper speed. In the several figures, I have represented a disk like cutter 18. To obtain the best results, I provide a disk cutter with a beveled or tapered outer face 19 and an inner, slightly concaved surface 20, so that only substantially the edge of the cutter engages the stock. The said cutter is fast upon a spindle 21 rotatable in a suitable sleeve-like bearing 22 secured by bolts 23 and pivot pin 24 to a plate 25, which is itself adjustably secured to a bracket 26 rigidly mounted upon or integral with the framing of the machine.

The stock is positioned flatwise against the bed plate with a longitudinal, straight edge thereof firmly against the gage 2 and is fed between the pairs of feed rollers 5, 11, and in its passage between said pairs of feed rollers is engaged by the cutter 18 mounted therebetween thereby severing a welting strip therefrom between the gage and the cutter. In order to sever the welting strip from the stock by a beveled cut as described, the spindle 21 of the cutter 18 is arranged at a suitable angle to the bed plate. Inasmuch as it is desirable from time to time to vary the angle of the bevel or taper, to meet trade demands, I provide means for varying the angle of inclination of the cutter 18. Preferably, however, the taper or bevel of the two edges of any given welting strip is the same. In the drawing, I have represented the cutter as arranged at an angle of substantially fifty-three degrees to the work, but I may adjust the same at any other desired angle. For purposes of adjustment I may provide any suitable mechanism but I have, in the present embodiment of the invention, provided the bearing 22 with the pivot pin 24. To secure the blade in its adjusted position, I provide the bearing sleeve 22 with ears 27 having therein a series of suitably alined holes to receive the bolts 23, whereby the cutter may be fixedly secured in predetermined position. The employment of a series of holes in any one of which each bolt 23 may be positioned is of importance, as the employment of slotted ears would permit the operative readily to tamper with the mechanism or to adjust the cutter to an improper angle. By providing a series of holes as stated, I render certain the adjustment of the cutter to the desired angle. In order to secure the bearing sleeve 22 in its determined position, I provide means co-acting with the ears 27 and bolts 23, and for that purpose have here represented a clamp 29 secured by a bolt 30, the inner edge of the clamp engaging an ear 31 formed upon the outer surface of the bearing sleeve 22 and having its surface concentric with the axis of the pivot pin 24, so that whatever be the adjustment of the bearing sleeve 22, the clamp 29 may engage the ear 31. Thus, the bearing sleeve 22 is held at both ends in adjusted position.

In order to provide for taking up wear of the cutter blade 18 and also to provide for the ready positioning and removal thereof, I adjustably mount the plate 25 upon the bracket 26. For that purpose, I have in Fig. 6 represented the plate 25 as provided with an ear 32 tapped for the reception of an adjusting screw 33 mounted in an overhanging portion 34 of the bracket 26. By the described means the plate 25 may upon rotation of the adjusting screw 33 be elevated for removal of the cutter 18 and returned to position, or from time to time the plate 25 may be lowered to take up wear of the cutter.

Figure 3:
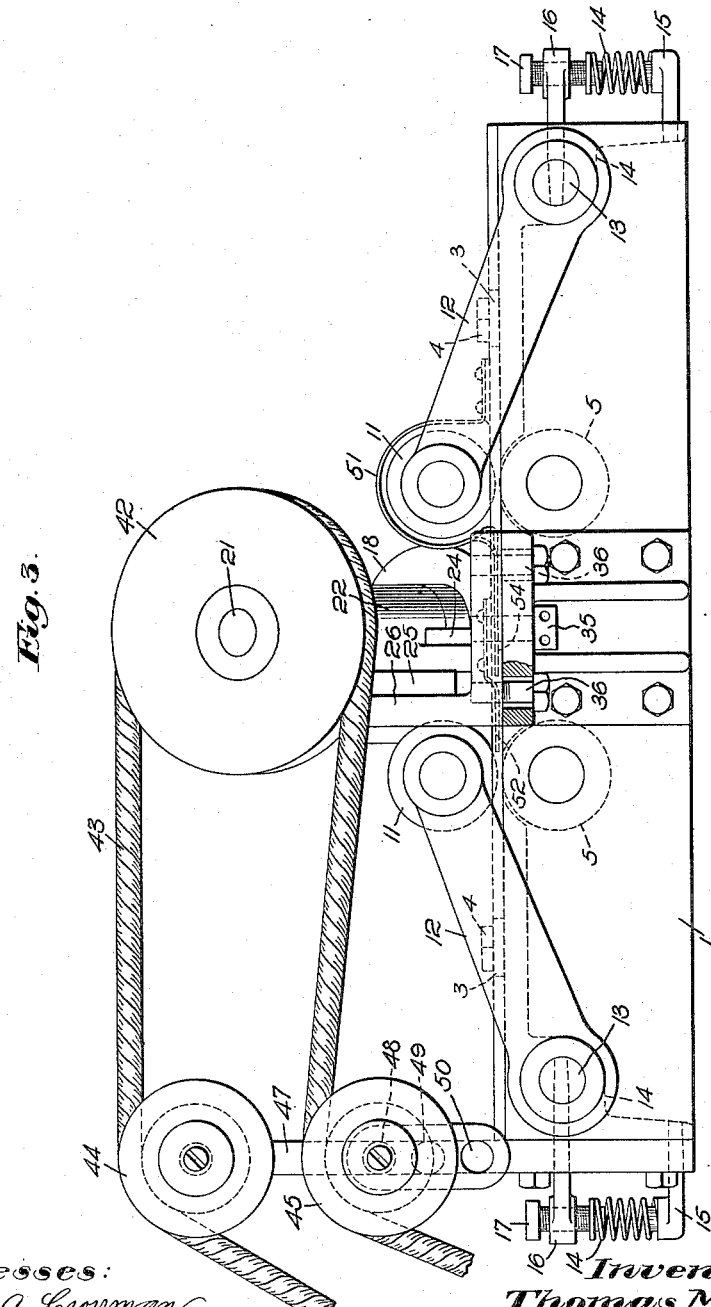
Fig. 3 is a rear elevation thereof.

I have found that with certain grades of stock, as, for example, with hard stock of varying hardness, and with thick leather, there is a tendency thereof to work away from the gage. Therefore I provide means to hold the inner edge of the stock firmly against the gage. This I have effectively accomplished by inclining very slightly the edge of the cutter 18 forwardly toward the gage with respect to the line of feed, thereby, as it were, wedging the stock against the gage. In order to position the cutter in the angular relation described and in order, if desired, to vary this angle, as it may be found necessary, I have provided the bracket 26 with a pivotal pin bolt 35 as shown most clearly in Fig. 5, and have also provided clamping bolts 36—36 shown most clearly in Fig. 3 as passing through elongated openings in the bracket, thereby to clamp the bracket with the cutter blade in the desired angular relation with respect to the gage 2.

In order to provide a suitable surface for the cutter 18 to embed into, I have in Fig. 5 represented a leather plug 37 which if desired may be formed as a circular disk positioned in a socket 38 formed in a slide 39 mounted in a groove in the upper face of the bed plate and held in adjusted position by a slot and screw 40, 41. By adjusting the slide 39, different portions of the leather or other plug 37 are presented to the cutter 18, and the adjustment also permits the ready removal and replacement of the disk 19 when it has become worn.

To secure the best results, the cutter blade 18 is driven in the direction of the feed of the material and at a higher rate of speed than said feed of the material. I have found in practice that when the cutter is driven at a speed approximately twice that of the feed rolls, I have secured excellent results. By driving the cutter at a faster speed than the speed of the stock, not only is the edge of the cutter kept sharper and a shearing cut provided, but a slight tension is imparted to the leather and thus the cutting is more readily and effectively accomplished. Moreover the driving of the cutter at a greater speed than the feed assists in feeding the material through the machine.

While the cutter may be driven in any suitable manner, I have herein represented the spindle 21 as provided upon its outer end with a pulley 42 receiving upon its grooved surface a driving belt 43 passing about guide pulleys 44, 45, and thence about a suitable pulley 46 upon the countershaft 9. I have herein represented the gearing as so proportioned that the cutter blade 18 is driven at twice the speed of the feed of the stock.

In order to permit the use of different sized pulleys 42, as I may wish to vary the speed of the cutter 18 and also to permit of the adjustment of the spindle 21 to different angles as previously described, I provide for adjustment of the guiding pulley 45. For that purpose I have here represented said guiding pulleys as mounted in a bracket 47 and provide the pulley 45 with a series of sockets 48, 49, 50 in any one of which it may be mounted.

In order to hold the work while the welting strips are being severed therefrom, I may provide any suitable mechanism. Herein for the purpose I have represented two springs 51 and 52 to bear upon the welting strip that is being severed. These two springs are secured in any suitable manner to the gage 2. Herein I have represented the spring 51 as encircling the upper front feed roller and having a flat end 53 bearing upon the upper surface of the welting strip closely adjacent the cutter 18. The spring 52 bears upon the upper surface of the welting strip closely in advance of said cutter. Each of said springs has one free end. In order to hold the remaining portion of the stock firmly upon the bed plate, I provide a third spring 54 preferably also secured to the gage 2 at one end and having its free end pressing upon the upper face of the stock outside of the cutter 18 and between the springs 51, 52.

From the foregoing description, it will be evident that I am enabled to sever from stock a welting strip having both edges beveled. So far as I am aware, this has never previously been accomplished. It is evident that it is necessary merely to bevel the inner edge of the stock previous to cutting any welting strip therefrom, after which successive welting strips may be severed, each having opposite edges beveled in parallelism. The beveled, inner edge of the stock may be provided in any suitable manner, as for example, by feeding the stock to the cutter 18.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Apparatus for cutting welting comprising in combination a bed plate, means to feed the stock therealong, a disk cutter 18 for severing welting strips from the stock having a supporting spindle 21, a sleeve bearing 22 therefor provided with projecting ears 27, bolts 23 positioned therein, and a pivotal support for said sleeve.

2. Apparatus for cutting welting comprising in combination a bed plate, means to feed the stock in a straight path along said bed plate, a disk cutter 18 for severing welting strips from the stock having a supporting spindle 21, a bearing sleeve 22 having a pivotal support 24, a supporting plate 25 to which the sleeve 22 is adjustably secured, and a support 26 to which the plate 25 is adjustably secured.

3. Apparatus for cutting stock comprising a bed plate, means to feed the stock therealong, a rotatable disk cutter, and a slide mounted in the bed plate and carrying an embedding surface for the cutter.

4. Apparatus for cutting stock comprising a bed plate, means to feed the stock therealong, a rotatable disk cutter, and a slide adjustably mounted in the bed plate and provided with a socket to receive an embedding surface for the cutter.

5. Apparatus for cutting welting comprising in combination a bed plate, two pairs of feed rolls, one member of each pair being positively driven and the other member thereof being yieldingly pressed thereagainst, and an interposed disk cutter having its cutting edge arranged at an acute angle to the face of the stock for severing a welting strip therefrom.

6. Apparatus for cutting welting comprising in combination a bed plate, a positively driven feed roll, a co-acting feed roll 11, a rocker arm 12 wherein it is rotatably mounted, a rocker shaft 13 for said rocker arm, and a cutter having its edge mounted at an acute angle to the face of the stock.

7. Apparatus for cutting welting comprising in combination a bed plate, means to feed the stock in a straight path therealong, a rotary cutter 18 for severing welting strips from the stock having a supporting spindle 21, a sleeve for said spindle, a bracket 26 whereon said sleeve is mounted and a pivotal support 35 for said bracket.

8. Apparatus for cutting welting comprising in combination a bed plate, means to feed stock in a straight path therealong, a disk cutter 18 for severing welting strips from the stock, a support therefor, and means to adjust said cutter about a plurality of axes.

9. Apparatus for cutting welting comprising in combination a bed plate, means to feed the stock therealong, a rotary cutter 18 having a supporting spindle and supporting means for said spindle including a pair of pivotal supports arranged transversely to each other and by which the cutter may be adjusted in a plurality of curved paths.

10. Apparatus for cutting welting comprising in combination a bed plate, means to feed the stock therealong, a rotary cutter 18 having a supporting spindle 21, a supporting sleeve 22 therefor having an axially pivoted support 24, and also having an ear 31, and a co-acting clamp 29 adapted to engage said ear.

11. Apparatus for cutting welting comprising, in combination, a bed plate, means to feed the stock therealong, a cutter 18 for severing welting strips from the stock, means positively to rotate the same, said cutter having a supporting spindle and supporting means for said spindle including a pair of pivotal supports arranged transversely to each other and by which the cutter may be adjusted in a plurality of curved paths.

12. Apparatus for cutting welting comprising, in combination, a bed plate, means to feed the stock therealong, a cutter 18, means positively to rotate the same, said cutter having a supporting spindle 21, a supporting sleeve 22 therefor having an axially pivoted support 24, an ear upon the sleeve, and a clamp coöperating therewith.

13. Apparatus for cutting welting comprising, in combination, a bed plate, means to feed the stock in a straight path therealong, a disk cutter 18, means positively to rotate the same, said cutter having a supporting spindle 21, a bearing sleeve therefor having a pivotal support 24, a supporting plate 25 for said sleeve, means adjustably to secure said sleeve to said plate, a support 26 for the plate 25 and a pivotal member for said support 26.

14. An apparatus for cutting welting strips comprising, in combination, a support, a gage, means coöperating with said gage to feed stock from which the welting strips are to be severed in a straight path, a cutter inclined with relation to the stock, and means to support said cutter in a position a substantial distance from said gage corresponding to the width of the welting strip, thereby to provide by consecutive cuts of the cutter welting having opposite faces tapered in the same direction.

15. An apparatus for cutting welting strips comprising, in combination, a support, a gage, means to feed the stock in a straight path along said gage, a cutter inclined with relation to the stock, means to support said cutter in a position to engage the stock at a substantial distance from said gage corresponding to the width of the welting strip, means to adjust said cutter toward and from said support, and means to vary the angular relation of said cutter with said support.

16. An apparatus for cutting welting strips comprising, in combination, a support, a gage, means to feed the stock in a straight path along said gage, a cutter inclined with relation to the stock, means to support said cutter at a substantial distance from said gage corresponding to the width of the welting strip, and means to position the cutter to wedge the stock against said gage.

17. An apparatus for cutting welting strips comprising in combination, a support, a gage, means to feed the stock in a straight path along said gage, a cutter inclined with relation to the stock, means to support said cutter a substantial distance from the stock edge corresponding to the width of the welting strip, means to adjust said support to vary the distance of the cutter from said gage, the angle of said cutter relative to said support, and the distance of said cutter from said support.

In testimony whereof, I have signed my name to this specification, in the presence of two subscribing witnesses.

THOMAS MARTIN.

Witnesses:
IRVING U. TOWNSEND,
EVERETT S. EMERY.

Copies of this patent may be obtained for five cents each, by addressing the "Commissioner of Patents, Washington, D. C."